May 11, 1965 E S. MACKEY ETAL 3,183,092
PHOTOGRAPHIC STRIPPING FILM
Filed Aug. 23. 1961
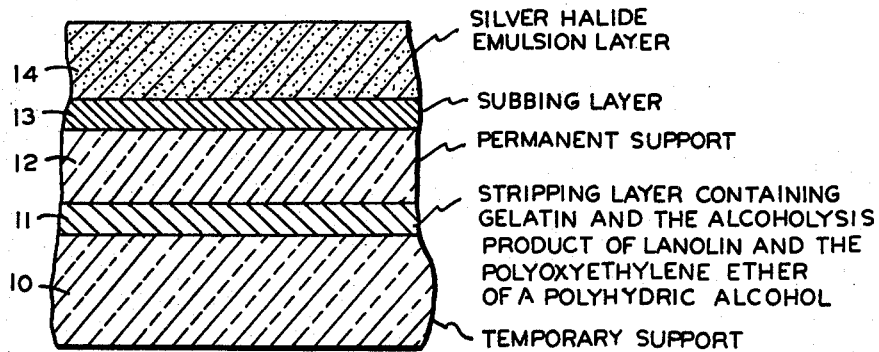
*INVENTORS*
E. SCUDDER MACKEY
RAYMOND J. WALFORD
BY
ATTORNEYS & AGENT

United States Patent Office 3,183,092
Patented May 11, 1965

3,183,092
PHOTOGRAPHIC STRIPPING FILM
E Scudder Mackey and Raymond J. Walford, both of Binghamton, N.Y., assignors to General Aniline & Film Corporation, New York, N.Y., a corporation of Delaware
Filed Aug. 23, 1961, Ser. No. 133,379
9 Claims. (Cl. 96—83)

This invention relates to photography and, more particularly to photographic stripping film.

Stripping films which are employed to a large extent in the graphic art depend for their stripping characteristics upon a special interlayer. This interlayer is generally a water-soluble adhesive layer joining the permanent and temporary supports, or a water-insoluble auxiliary layer of cellulose ester, cellulose ether, gelatin, synthetic resin or water-insoluble colloidal material which serves as a temporary binder between the permanent and the temporary support. The adhesion between the interlayer and the temporary support is sufficient to permit emulsion coating, slitting and other film handling operations including development, but the adhesion is sufficiently low to permit continuous and rapid stripping of the permanent support from the temporary support at any time after development.

Stripping can be performed either in the wet or in the dry stage, although it is most desirable that the interlayer be constructed in such a way that it permits stripping when wet and when dry, thus giving the greatest degree of versatility to the operation. Most interlayers do not meet both of these qualifications so that it is fairly common that the temporary and the permanent layers separate prematurely during processing, at a time when such separation is highly undesirable. In other instances, when the adhesion is sufficiently great during the processing so as to permit the staying together of the permanent and temporary supports, recourse must be taken to dry stripping. However, in many instances, the separation of the two layers is far from easy with the unfortunate result that during the removal of the temporary layer from the permanent support, one or both of these two layers or even the emulsion layer is frequently damaged. Even under the most ideal conditions, stripping films have the pronounced tendency to curl in spite of the application of non-curling (NC) layers to the temporary support.

It is, therefore, an object of the instant invention to provide a stripping film which permits both dry and wet stripping without damaging the thin membrane consisting of the permanent support and the gelatin layer which bares the silver image. Another object is to provide a stripping film in which the tendency to curl is minimized. Other objects will be apparent from the following description.

We have found that an improved stripping film can be obtained by using as an interlayer between the permanent support and the temporary support a gelatin composition which uses gelatin as a colloidal carrier material and contains in addition a water-soluble or water dispersible alcoholysis product of lanolin and of the polyoxyethylene ether of a polyhydric alcohol. This product can be prepared by heating together lanolin and a polyoxyethylene ether of a polyhydric alcohol. As examples of the polyhydric alcohols, polyoxyethylene ethers of which may be employed in the alcoholysis may be mentioned ethylene glycol, propylene glycol, glycerol, sorbitol, sorbitan, mannitol and mannitan. In general, polyhydric alcohols which contain as many as 6 carbon atoms per molecule and at least two-thirds as many hydroxyl radicals as carbon atoms may be used.

Water dispersible products may be generally be obtained when the product contains oxyethylene radical, polyhydric alcohol, oxyethylene ether and lanolin in proportions as low as 0.5 part by weight of oxyethylene ether and as high as 6 parts by weight of oxyethylene ether per part by weight of lanolin, but not more than about 2.5 mols of oxyethylene ether of polyhydric alcohol per mol of lanolin and as low as about 0.5 mol of oxyethylene radical and as high as about 20 mols of oxyethylene radical per equivalent weight of hydroxyl radical in the polyhydric alcohol. The preparation of these alcoholysis products is described in more detail in U.S.P. 2,478,820.

In the preparation of the interlayer, a gelatin solution containing from 4 to 12 percent by weight of gelatin is used. To this gelatin solution is added the alcoholysis product of lanolin and the polyoxyethylene ether of the polyhydric alcohol in amounts ranging from 1 to 30 percent per weight of dry gelatin. Concentrations ranging from 6 to 10 percent of gelatin per liter and from 8 to 12 percent of alcoholysis product per dry weight of gelatin are preferred. This interlayer may contain suitable wetting agents such as sodium oleyl-methyl-taurate and/or saponin and may also contain hardening agents such as formaldehyde, glyoxal or mucochloric acid.

The temporary support is usually a cellulose ester film such as a cellulose acetate film having an acetyl content of about 54–61 percent combined acetic acid. In place of cellulose acetate, there can be used cellulose butyrate, cellulose acetate propionate, cellulose propionate, polystyrene, polycarbonate or the copolymer of vinyl chloride and vinyl acetate. The thickness of this layer ranges from 100 to 200 microns with a thickness of 140 microns being most common. The permanent support layer is prepared from cellulose nitrate, cellulose acetate containing from 56–61 percent combined acetic acid, or from polycarbonate. Its thickness ranges from 6 to 15 microns, with a thickness of about 10 microns being most common. The thickness of the stripping layer ranges from 3½ to 8½ microns.

The invention is further illustrated by the accompanying drawing which shows in cross action a stripping film carrying on the temporary support 10, a stripping layer 11 which contains gelatin and the alcoholysis product of lanolin and polyoxyethylene ether of a polyhydric alcohol, a subbing layer 13 and a silver halide emulsion layer 14.

The invention will be further illustrated by the following examples, but it is to be understood that the invention is not restricted thereto.

*Example I*

A substantially fully esterified cellulose acetate film having a combined acetic acid content of about 60 percent and serving as a temporary support was coated with a stripping layer having the following composition:

| | Grams |
|---|---|
| Gelatin | 80 |
| Alcoholysis product of lanolin and polyoxyethylene ether of sorbitol prepared in accordance with Example I of U.S.P. 2,478,820 | 8 |
| Formaldehyde | .6 |

This interlayer is coated upon the temporary support, dried and overcoated with a cellulose nitrate layer which serves as the permanent support. This layer is provided with a subbing layer and coated with a gelatin silver halide emulsion layer of the type used in graphic art film. The film was exposed, developed, fixed and washed in a normal fashion. Subsequent testing of the material showed that the permanent support could be readily stripped from the adhesive layer, either in the wet or in the dry stage without damage to either the temporary or permanent support. A comparison material prepared without the use of the lanolin derivative in the adhesive layer did not permit satisfactory stripping.

Example II

Example I was repeated with the exception that both the permanent and temporary supports were prepared from polycarbonate and that the stripping layer contained in addition to gelatin the reaction product of lanolin with the polyoxyethylene ether of glycerol prepared in accordance with Example VII of U.S.P. 2,478,820. In place of the .8 gram of formaldehyde, the stripping layer contained the same amount of mucochloric acid. The material was processed in the conventional manner, and permitted satisfactory restripping in the wet or in the dry state.

Our invention is capable of numerous variations as far as the compositions of the temporary support, the permanent support, the subbing layers and the emulsions are concerned. Therefore, we do not intend to be limited in the patent granted except as necessitated by the appended claims.

We claim:

1. A photographic stripping film comprising in the following order and in contiguous contact a transparent temporary support, a stripping layer, a permanent support carrying a light-sensitive silver halide emulsion layer, said stripping layer comprising gelatin as a colloidal carrier and having uniformly dispersed therein a lanolin product which comprises the alcoholysis product of lanolin and of a polyoxyethylene ether of a polyhydric alcohol, the amount of alcoholysis product ranging from 1 to 30% per weight of dry gelatin.

2. A photographic stripping film comprising a temporary transparent plastic support carrying in the following order, a stripping layer comprising gelatin as a colliodal carrier having uniformly dispersed therein a lanolin product which comprises the alcoholysis product of lanolin and of a polyhydric alcohol polyoxyethylene ether, a permanent support, a subbing layer and a light-sensitive silver halide emulsion layer, said stripping layer comprising gelatin as a colloidal carrier material having uniformly dispersed therein from 1 to 30% per weight of dry gelatin the alcoholysis product of lanolin and a polyhydric alcohol polyoxyethylene ether, each base polyhydric alcohol in said ether containing no more than 6 carbon atoms per molecule and at least two-thirds as many hydroxyl groups per molecule as carbon atoms, the mol proportion of ethylene oxide radical to hydroxyl radical in said polyhydric alcohol being between about 0.5 and about 20, and the weight of oxyethylene ether being between about 0.5 and about 6 times the weight of lanolin, but the mol proportion of oxyethylene ether per mol of lanolin being not more than about 2.5.

3. A photographic stripping film according to claim 2 wherein the amount of alcoholysis product present in the stripping layer is on the order of 10 percent based on the dry weight of the gelatin.

4. A stripping film according to claim 2 wherein the polyhydric alcohol oxyethylene ether is selected from the group consisting of oxyethylene ethers of ethylene glycol, propylene glycol, glycerine and sorbitol.

5. A photographic stripping film according to claim 2 wherein said temporary support is prepared from a high molecular weight plastic selected from the group consisting of cellulose acetate, cellulose butyrate, cellulose acetate propionate, cellulose propionate, polystyrene, polycarbonate or the copolymer of vinyl chloride and vinyl acetate.

6. A stripping film according to claim 2 wherein said permanent layer is prepared from a high molecular weight compound selected from the group consisting of cellulose nitrate, cellulose acetate and polycarbonate.

7. A photographic stripping film according to claim 2 wherein the thickness of said permanent layer ranges from 6 to 15 microns, the thickness of the stripping layer ranges from 3.5 to 8.5 microns, and the thickness of the temporary support ranges from 100 to 200 microns.

8. A stripping film according to claim 1 wherein said stripping layer contains also an aliphatic organic gelatin hardening agent.

9. A stripping film according to claim 8 wherein said aliphatic organic hardening agent is selected from the group consisting of formaldehyde, glyoxal and mucochloric acid.

No references cited.

NORMAN G. TORCHIN, *Primary Examiner.*